(12) United States Patent
Lee et al.

(10) Patent No.: US 12,356,194 B2
(45) Date of Patent: Jul. 8, 2025

(54) METHOD AND APPARATUS FOR DETECTING COVERT CHANNEL FOR WIRELESS COMMUNICATION

(71) Applicant: ELECTRONICS AND TELECOMMUNICATIONS RESEARCH INSTITUTE, Daejeon (KR)

(72) Inventors: Sang-Woo Lee, Daejeon (KR); Yong-Sung Jeon, Daejeon (KR); Ha-Young Seong, Daejeon (KR); You-Sung Kang, Daejeon (KR); Ik-Kyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 443 days.

(21) Appl. No.: 17/842,399

(22) Filed: Jun. 16, 2022

(65) Prior Publication Data

US 2023/0077314 A1  Mar. 9, 2023

(30) Foreign Application Priority Data

Sep. 8, 2021  (KR) .................. 10-2021-0119765

(51) Int. Cl.
*H04W 12/121* (2021.01)
*H04L 27/26* (2006.01)

(52) U.S. Cl.
CPC ....... *H04W 12/121* (2021.01); *H04L 27/2605* (2013.01)

(58) Field of Classification Search
CPC ............. H04W 12/121; H04L 27/2605; H04L 27/2678; H04L 27/3483; H04L 27/3488; H04L 27/2666
See application file for complete search history.

(56) References Cited

U.S. PATENT DOCUMENTS

| | | | |
|---|---|---|---|
| 7,920,705 B1 | 4/2011 | Bean | |
| 9,201,778 B2 | 12/2015 | Northcutt et al. | |
| 2017/0303312 A1* | 10/2017 | Agiwal | H04W 74/0816 |
| 2018/0132271 A1 | 5/2018 | Jung et al. | |
| 2018/0317256 A1 | 11/2018 | Um et al. | |
| 2019/0392134 A1* | 12/2019 | Bilzor | G06F 21/62 |
| 2021/0176784 A1* | 6/2021 | Hirata | H04L 5/14 |

FOREIGN PATENT DOCUMENTS

| | | |
|---|---|---|
| KR | 10-2013-0100250 A | 9/2013 |
| KR | 10-2020-0105133 A | 9/2020 |
| KR | 10-2227317 B1 | 3/2021 |

OTHER PUBLICATIONS

Fahimeh Rezaei, et. al., "A novel automated framework for modeling and evaluating covert channel algorithms", Security and Communication Networks 2015 (May 29, 2014).
Wang Chong, et. al., "Categorization of Covert Channels and Its Application in Threat Restriction Techniques", Journal of Software, 2020 (Dec. 31, 2019).

* cited by examiner

*Primary Examiner* — Quazi Farooqui
(74) *Attorney, Agent, or Firm* — Rabin & Berdo, P.C.

(57) ABSTRACT

Disclosed herein is a method for detecting a covert channel in wireless communication. The method includes setting a wireless communication specification, detecting a covert timing channel, and detecting a covert storage channel.

16 Claims, 12 Drawing Sheets

METHOD AND APPARATUS FOR DETECTING COVERT CHANNEL FOR WIRELESS COMMUNICATION

CROSS REFERENCE TO RELATED APPLICATION

This application claims the benefit of Korean Patent Application No. 10-2021-0119765, filed Sep. 8, 2021, which is hereby incorporated by reference in its entirety into this application.

BACKGROUND OF THE INVENTION

1. Technical Field

The present invention relates generally to technology for detecting a covert channel in a wireless communication environment.

More particularly, the present invention relates to technology for detecting a covert timing channel and a covert storage channel based on wireless communication specification information.

2. Description of the Related Art

Channels for wireless communication may be categorized as overt channels and covert channels. An overt channel is a channel through which communication is performed in compliance with normal communication specifications. In contrast, a covert channel is a hidden communication channel that is not open to normal users and violates security policies.

Covert channels are classified into covert timing channels and covert storage channels.

A covert timing channel is a way of transmitting covert information using time information of normal traffic. That is, when normal packets are transmitted at regular intervals, a sender adjusts the time interval of packet transmission, thereby transmitting covert information.

A covert storage channel is a way of directly storing covert information in network traffic. That is, covert information is transmitted by being inserted into the header or body area of a protocol.

Such a covert channel cannot be detected by a firewall, an intrusion detection system, or the like, which are existing network security devices for detecting attacks performed according to an existing communication protocol specification.

Therefore, technology for detecting the above-described covert timing channels and covert storage channels is urgently required.

Documents of Related Art (Patent Document 1) Korean Patent Application Publication No. 10-2020-0105133, titled "System for covert channel configuration based on software using mutex object in virtualization technology"

(Patent Document 2) Korean Patent Application Publication No. 10-2013-0100250, titled "Covert channel for conveying supplemental messages in protocol-defined link for system of storage devices".

SUMMARY OF THE INVENTION

An object of the present invention is to provide a method for detecting a covert timing channel and a covert storage channel.

Another object of the present invention is to provide a method for detecting a covert timing channel by analyzing periodic characteristics of received signals.

A further object of the present invention is to provide a method for detecting a covert storage channel by analyzing various types of information about received signals.

In order to accomplish the above objects, a method for detecting a covert channel in wireless communication according to an embodiment of the present invention includes setting a wireless communication specification, detecting a covert timing channel, and detecting a covert storage channel.

Here, detecting the covert timing channel may include identifying a periodic signal based on the wireless communication specification, analyzing the reception time and the received frame of the periodic signal, and outputting a covert timing channel warning based on the analysis result.

Here, analyzing the reception time and the received frame of the periodic signal may comprise determining that a covert timing channel is present when the frequency at which the period of the received signal changes is greater than a preset value.

Here, analyzing the reception time and the received frame of the periodic signal may comprise determining that a covert timing channel is present when it is determined based on the distribution of the periodic signal that the number of signals having a period different from a preset period is greater than a threshold.

Here, detecting the covert storage channel may include detecting a covert storage channel based on the header or body information of a communication protocol, detecting a covert storage channel based on constellation diagram distortion information, and detecting a covert storage channel based on information about a Cyclic Prefix (CP) interval.

Here, detecting the covert storage channel based on the header or body information of the communication protocol may include setting the target field to be analyzed in a received frame, calculating the value of an XOR operation on the currently received value of the target field and the value received immediately before the currently received value, and detecting the covert storage channel based on the value of the XOR operation.

Here, detecting the covert storage channel based on the value of the XOR operation may comprise increasing a change count when the value of the XOR operation is not 0 and determining that a covert storage channel is present when the change count is greater than a threshold.

Here, detecting the covert storage channel based on the constellation diagram distortion information may include measuring constellation diagrams at multiple points that are different distances away from a wireless communication device and detecting the covert storage channel based on the constellation diagrams corresponding to the multiple points.

Here, detecting the covert storage channel based on the information about the CP interval may include storing the information about the CP interval contained in an Orthogonal Frequency-Division Multiplexing (OFDM) symbol and detecting the covert storage channel based on a result of comparison of the CP interval with a part corresponding to the CP interval in the OFDM symbol.

Also, in order to accomplish the above objects, an apparatus for detecting a covert channel in wireless communication according to an embodiment of the present invention includes a configuration unit for setting a wireless communication specification, a covert timing channel detection unit for detecting a covert timing channel, and a covert storage channel detection unit for detecting a covert storage channel.

Here, the covert timing channel detection unit may identify a periodic signal based on the wireless communication specification, analyze the reception time and the received frame of the periodic signal, and output a covert timing channel warning based on the analysis result.

Here, the covert timing channel detection unit may determine that a covert timing channel is present when the frequency at which the period of the received signal changes is greater than a preset value.

Here, the covert timing channel detection unit may determine that a covert timing channel is present when it is determined based on the distribution of the periodic signal that the number of signals having a period different from a preset period is greater than a threshold.

Here, the covert storage channel detection unit may detect a covert storage channel based on the header or body information of a communication protocol, detect a covert storage channel based on constellation diagram distortion information, and detect a covert storage channel based on information about a Cyclic Prefix (CP) interval.

Here, the covert storage channel detection unit may set the target field to be analyzed in a received frame, calculate the value of an XOR operation on the currently received value of the target field and a value received immediately before the currently received value, and detect the covert storage channel based on the value of the XOR operation.

Here, the covert storage channel detection unit may increase a change count when the value of the XOR operation is not 0, and determine that a covert storage channel is present when the change count is greater than a threshold.

Here, the covert storage channel detection unit may measure constellation diagrams at multiple points that are different distances away from a wireless communication device, and detect the covert storage channel based on the constellation diagrams corresponding to the multiple points.

Here, the covert storage channel detection unit may store the information about the CP interval contained in an Orthogonal Frequency-Division Multiplexing (OFDM) symbol and detect the covert storage channel based on a result of comparison of the CP interval with a part corresponding to the CP interval in the OFDM symbol.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
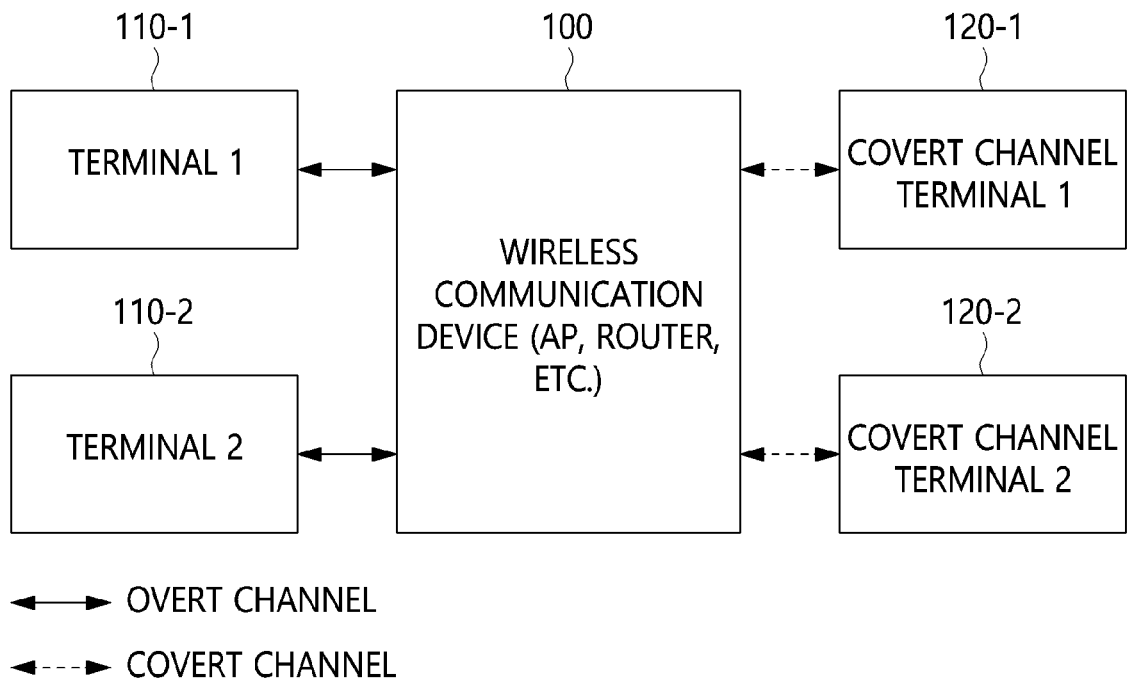
FIG. 1 is a view conceptually illustrating an overt channel and a covert channel in a wireless communication environment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view conceptually illustrating an overt channel and a covert channel in a wireless communication environment.

Referring to FIG. 1, it can be seen that a wireless communication environment according to an embodiment includes a wireless communication device 100, terminals 110-1 and 110-2, and covert channel terminals 120-1 and 120-2.

Here, terminal 1 (110-1) and terminal 2 (110-2) are terminals using an overt channel.

Here, covert channel terminal 1 (120-1) and covert channel terminal 2 (120-2) are terminals using a covert channel.

For example, the wireless communication device 100 may be a Wi-Fi Access Point (AP), a router, or the like, and is a device for performing communication via an overt channel and a covert channel.

The wireless communication device 100 provides a normal network service to normal terminal 1 (110-1) and normal terminal 2 (110-2) through an overt channel.

Also, the wireless communication device 100 is capable of conveying covert information to covert channel terminal 1 (120-1) and covert channel terminal 2 (120-2) through a covert channel.

In an environment in which a covert channel is present, as described above, the wireless communication device 100 provides normal network service to normal terminal 1 (110-1) and normal terminal 2 (110-2), and because malicious behavior, such as a DDoS attack, or the like, which is an existing network security threat, does not occur in the normal network service, there is a problem in that a firewall or an intrusion detection system, which is an existing security device, cannot detect the formation of a covert channel.

Figure 2:
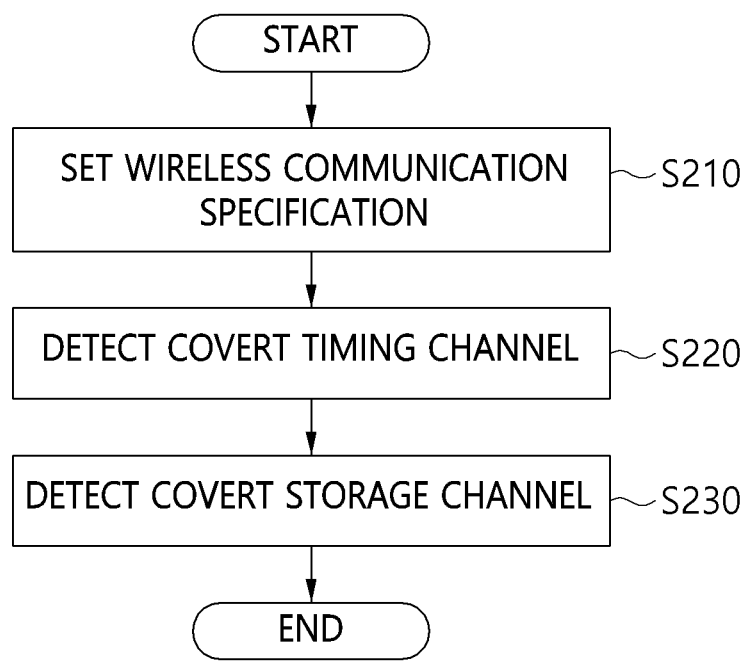
FIG. 2 is a flowchart illustrating a method for detecting a covert channel in wireless communication according to an embodiment of the present invention.

FIG. 2 is a flowchart illustrating a method for detecting a covert channel in wireless communication according to an embodiment of the present invention.

Referring to FIG. 2, in the method for detecting a covert channel in wireless communication, which is performed by an apparatus for detecting a covert channel in wireless communication, a wireless communication specification based on which it is intended to detect a covert channel is set at step S210.

For example, when validation for checking a covert channel of a Wi-Fi Access Point (AP) is performed, a Wi-Fi protocol version corresponding thereto may be set. The Wi-Fi protocol version may be set to IEEE 802.11a, IEEE 802.11b, IEEE 802.11n, IEEE 802.11ac, IEEE 802.11ax, or the like.

Subsequently, a covert timing channel is detected at step S220. Here, detecting a covert timing channel at step S220 may comprise detecting a covert timing channel based on the set wireless communication specification.

Hereinafter, a method for detecting a covert timing channel according to an embodiment will be described in detail with reference to FIG. 3.

Figure 3:
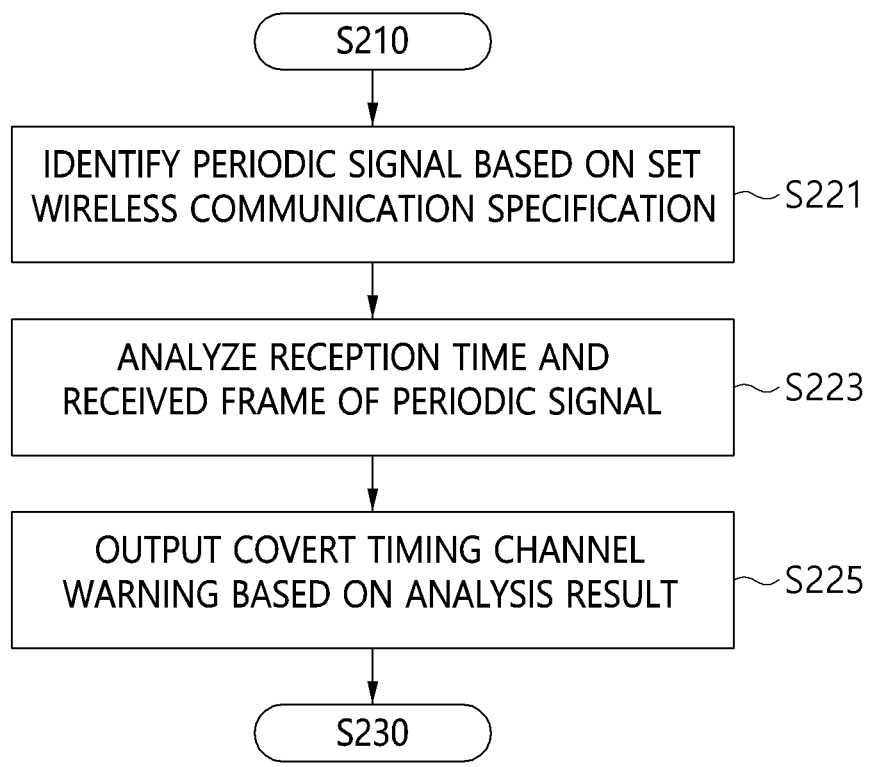
FIG. 3 is a flowchart illustrating in detail a step of detecting a covert timing channel.

FIG. 3 is a flowchart illustrating in detail a step (S220) of detecting a covert timing channel.

Referring to FIG. 3, detecting a covert timing channel at step S220 may include identifying a periodic signal based on the set wireless communication specification at step S221, analyzing the reception time and the received frame of the periodic signal at step S223, and outputting a covert timing channel warning based on the analysis result at step S225.

Identifying a periodic signal based on the wireless communication specification at step S221 will be described taking Wi-Fi as an example. However, the scope of the present invention is not limited thereto.

When a Wi-Fi specification is set, a beacon specified in the Wi-Fi specification may be set as a corresponding periodic signal.

Here, the beacon is information broadcasted by an AP to nearby devices, and contains information on settings of a corresponding wireless network.

Here, the time interval of the beacon is a parameter that can be set by the AP, and is typically set to 100 Time Unit (TU).

Here, because one TU is 1024 microseconds, an AP generally broadcasts a beacon at an interval of 102.4 milliseconds.

Here, a beacon frame is configured with a MAC header, a frame body, and a Frame Check Sequence (FCS). The frame body of the beacon frame may be configured with a mandatory area and an optional area.

Here, analyzing the reception time and the received frame of a periodic signal at step S223 may comprise determining that a covert timing channel is present when the frequency at which the period of the received signal is changed is greater than a preset value.

Also, when the frequency at which the period of the received signal is changed is equal to or less than the preset value, it may be determined that no covert timing channel is present.

In another embodiment, analyzing the reception time and the received frame of the periodic signal at step S223 may comprise determining that a covert timing channel is present when it is determined based on the distribution of the periodic signal that the number of signals having a period different from a preset period is greater than a threshold.

Also, when it is determined based on the distribution of the periodic signal that the number of signals having a preset period is equal to or greater than a preset number, it may be determined that no covert timing channel is present.

Subsequently, a covert storage channel is detected at step S230. Here, detecting a covert storage channel at step S230 may be performed in parallel to detecting a covert timing channel at step S220.

Hereinafter, detecting a covert storage channel at step S230 will be described in detail with reference to FIG. 4.

Figure 4:
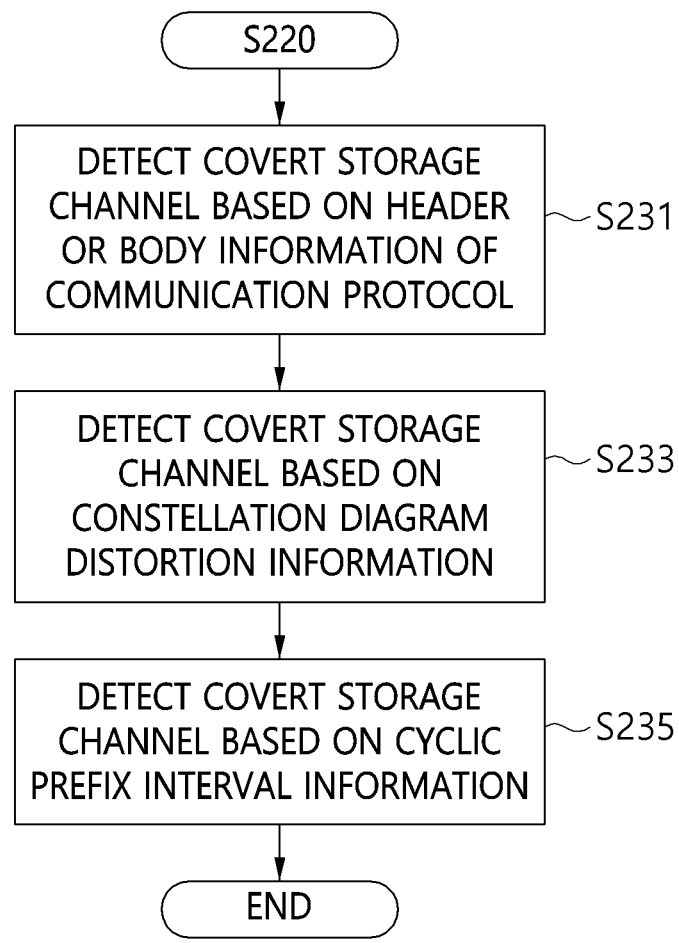
FIG. 4 is a flowchart illustrating in detail a step of detecting a covert storage channel.

FIG. 4 is a flowchart illustrating in detail a step (S230) of detecting a covert storage channel.

Referring to FIG. 4, detecting a covert storage channel at step S230 may include detecting a covert storage channel based on the header or body information of a communication protocol at step S231, detecting a covert storage channel based on constellation diagram distortion information at step S233, and detecting a covert storage channel based on cyclic prefix (CP) interval information at step S235.

Here, steps S231, S233, and S235 may be performed in parallel.

Here, detecting a covert storage channel based on the header or body information of a communication protocol at step S231 may include setting the target field to be analyzed in a received frame, calculating the result of an XOR operation on the currently received value of the target field and the value received immediately before the currently received value, and detecting a covert storage channel based on the result of the XOR operation.

Here, the target field to be analyzed may be a field that is seldom changed in the received frame.

For example, if the value of a MAC header, which is typically seldom changed, is frequently changed, there is the possibility of presence of a covert storage channel for hiding covert information in the MAC header, so the MAC header may be set as the target field to be analyzed.

Here, detecting a covert storage channel based on the result of an XOR operation comprises increasing a change count when the result of the XOR operation is not zero, and determining that a covert storage channel is present when the change count is greater than a threshold.

Here, the change count may be set so as to correspond to each target field to be analyzed, or may indicate the sum of the counts of all of the target fields to be analyzed.

Here, detecting a covert storage channel based on constellation diagram distortion information at step S233 may include measuring constellation diagrams at multiple points that are different distances away from a wireless communication device and detecting a covert storage channel based on the constellation diagrams corresponding to the multiple points.

For example, when multiple constellation diagrams are measured while moving from a first point, which is a first distance away from the wireless communication device, to a second point, which is a second distance, which is less than the first distance, away from the wireless communication device, if no covert channel is present, an ideal constellation diagram has to be observed as coming closer to the second point.

Accordingly, if a constellation diagram in a noise environment is still measured even at a measurement point close to the second point, it may be determined that a covert storage channel using constellation diagram modulation is present.

Here, detecting a covert storage channel based on cyclic prefix (CP) interval information at step S235 may include storing information about a cyclic prefix interval contained in an Orthogonal Frequency-Division Multiplexing (OFDM) symbol and detecting a covert storage channel based on a result of comparison of the cyclic prefix interval with a part corresponding to the cyclic prefix interval in an effective symbol section.

For example, when a cyclic prefix interval is generated by copying the last ¼ part of the OFDM symbol, the apparatus for detecting a covert channel in wireless communication may determine that a covert storage channel is present when the last ¼ part of the symbol is different from the content of the cyclic prefix interval.

Figure 5:
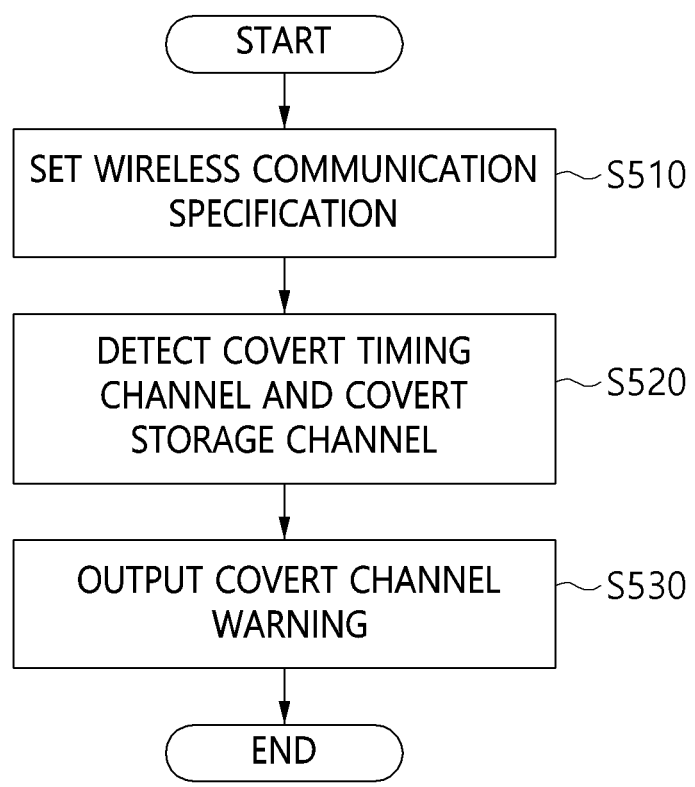
FIG. 5 is a flowchart illustrating a method for detecting a covert channel in wireless communication according to another embodiment of the present invention.

FIG. 5 is a flowchart illustrating a method for detecting a covert channel in wireless communication according to another embodiment of the present invention.

Referring to FIG. 5, in the method performed by the apparatus for detecting a covert channel in wireless communication, the wireless communication specification based on which whether a covert channel is present is to be checked is set at step S510.

For example, when it is intended to perform validation for checking a covert channel of a Wi-Fi Access Point (AP), a Wi-Fi protocol version corresponding thereto is set. The Wi-Fi protocol version may be set to IEEE 802.11a, IEEE 802.11b, IEEE 802.11n, IEEE 802.11ac, IEEE 802.11ax, or the like.

Subsequently, the process of detecting a covert timing channel and the process of detecting a covert storage channel are performed at step S520.

When it is determined that a covert channel is present in the above detection process at step S520, a covert channel warning is output at step S530.

Figure 6:
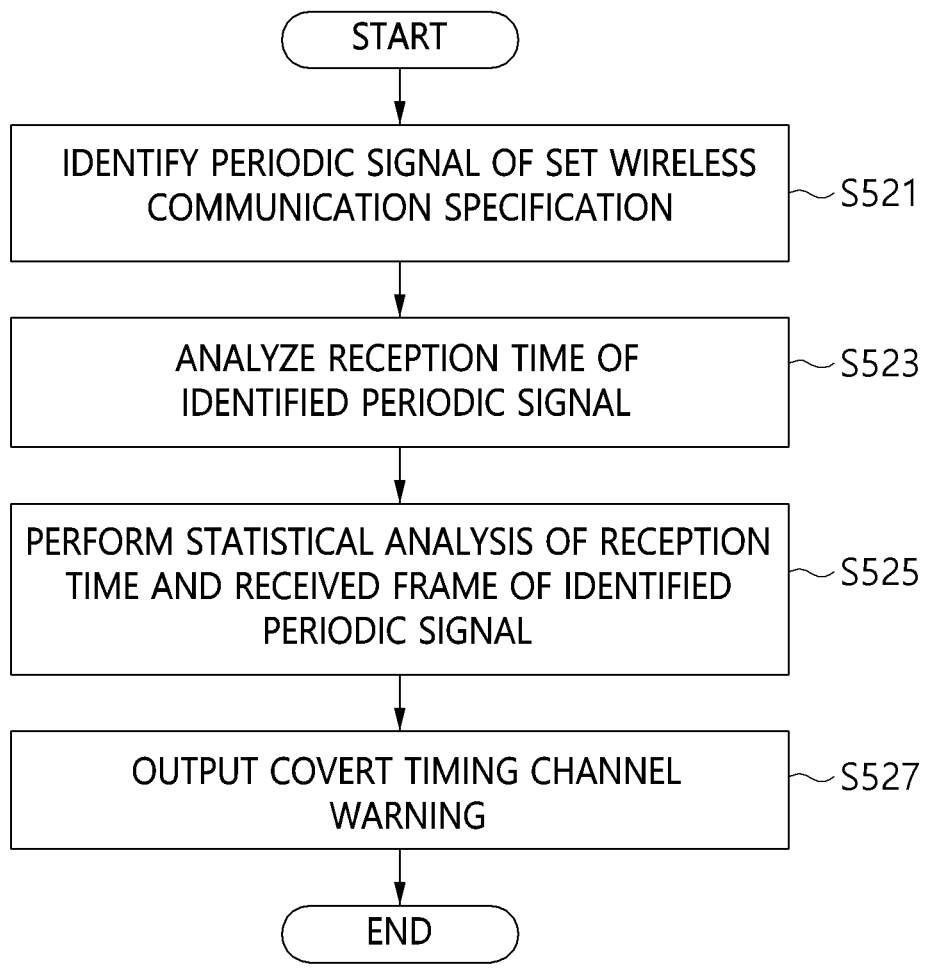
FIG. 6 is a flowchart illustrating in detail a step of detecting a covert channel.

FIG. 6 is a flowchart illustrating in detail a step (S520) of detecting a covert channel.

Referring to FIG. 6, in the step (S520) of detecting a covert channel, a periodic signal according to the communication protocol, which is set at the step (S510) of setting a wireless communication specification, is identified at step S521.

Subsequently, the reception time of the periodic signal identified at step S521 is analyzed at step S523.

Subsequently, the statistical characteristics of the reception time of the periodic signal, analyzed at step S523, and the number of received frames of the periodic signal are analyzed.

Based on the result of analysis at step S523, a warning is output at step S527 depending on whether a covert timing channel is present.

Hereinafter, identifying a periodic signal according to a communication protocol at step S521 will be described in detail.

Identifying a periodic signal according to a communication protocol at step S521 is the process of identifying a periodic signal according to the communication protocol set at the step (S510) of setting a wireless communication specification. For example, a description will be made taking Wi-Fi as an example.

When a Wi-Fi specification is set, a beacon specified in the Wi-Fi specification may be set as a corresponding periodic signal. The beacon is information broadcasted by an AP to nearby devices, and contains information on settings of a corresponding wireless network.

The time interval of the beacon is a parameter that can be set by the AP, but is typically set to 100 Time Unit (TU). One TU is 1024 microseconds.

That is, an AP generally broadcasts a beacon to nearby devices at an interval of 102.4 milliseconds.

Figure 7:
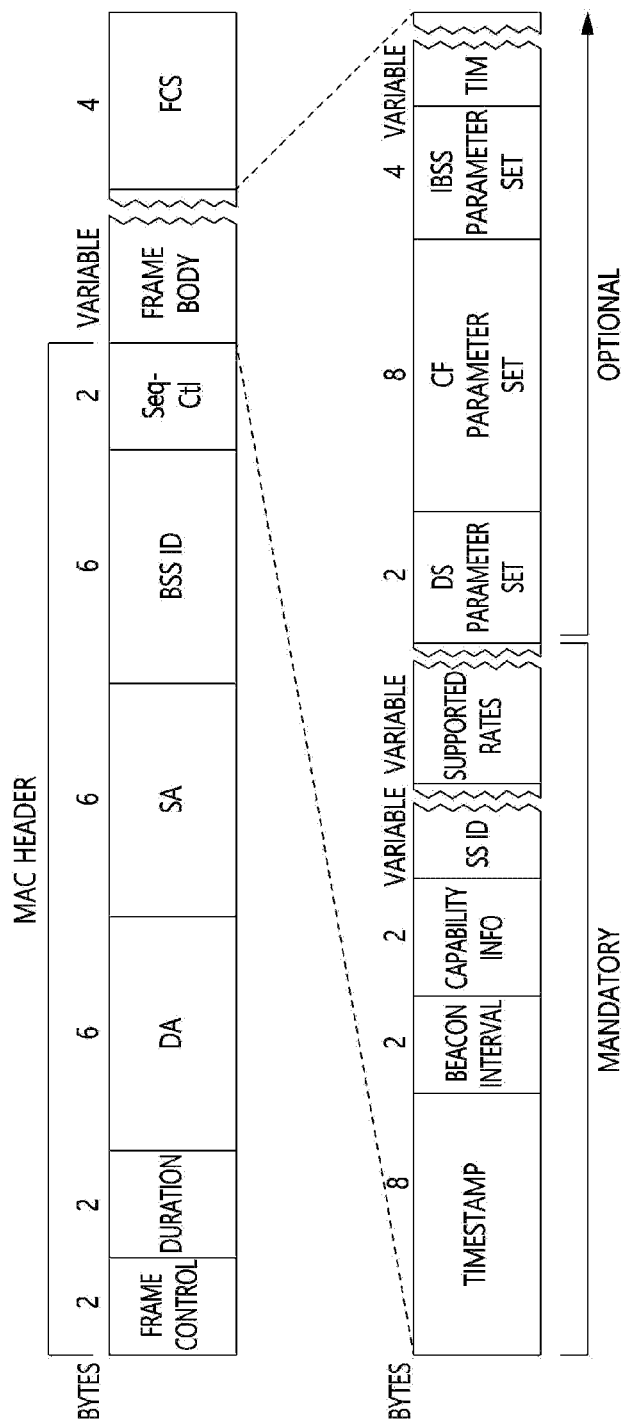
FIG. 7 is a view illustrating an example of a beacon frame specification.

FIG. 7 is a view illustrating an example of a beacon frame specification.

Referring to FIG. 7, it can be seen that a beacon frame is configured with a MAC header, a frame body, and a Frame Check Sequence (FCS).

Here, the frame body of a beacon frame is configured with five mandatory fields and optional fields, as shown in FIG. 7.

Here, the 'Timestamp' field indicates the time at which an AP generates and transmits a beacon frame.

Here, the 'Beacon Interval' field indicates the time interval of a beacon. The default value thereof is 100 TU, which is 102.4 milliseconds.

Here, the 'Capability Info' field contains information about the characteristics of the AP, such as an Extended Service Set (ESS), whether a short preamble is supported, and the like.

Here, the 'Service Set ID (SSID)' field indicates the ID of the AP on a network.

Here, the 'Supported Rates' field indicates the data rates that can be supported by the AP.

Hereinafter, analyzing the reception time of the identified periodic signal at step S523 will be described in detail.

For example, in the case of Wi-Fi, the apparatus for detecting a covert channel in wireless communication receives a beacon from an AP and records the number of received beacons according to the beacon time interval.

Figure 8:
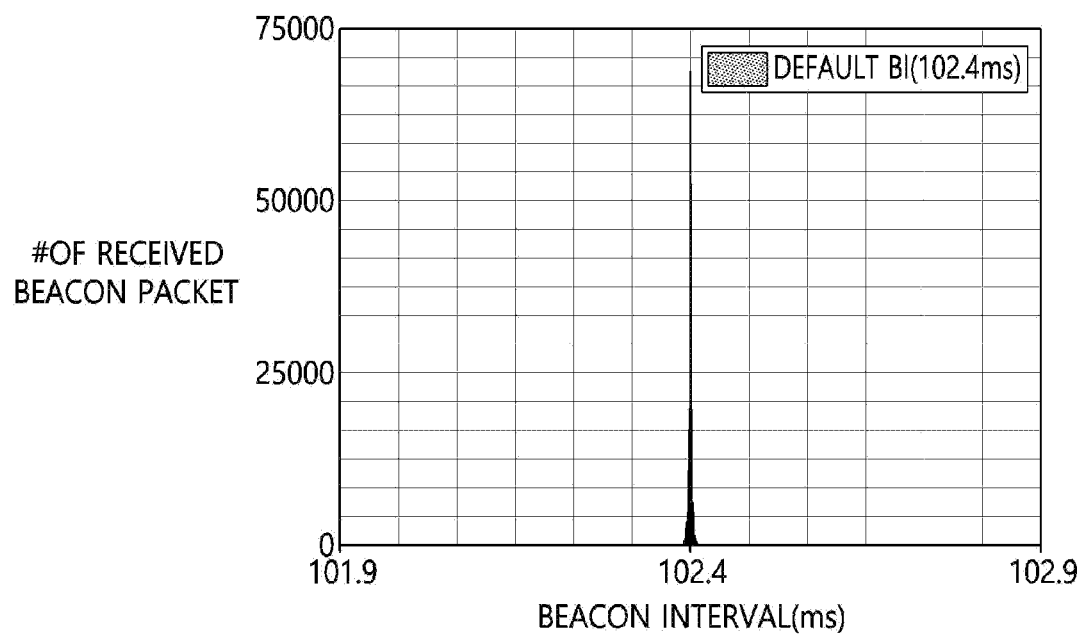
FIG. 8 is a view illustrating an example of a result of reception of a beacon.

FIG. 8 is a view illustrating an example of the result of reception of a beacon.

Referring to FIG. 8, the result of reception of beacons that are received at an interval of 102.4 msec., which is a default time interval of the beacons, can be seen.

In the distribution of the time intervals of the received beacons, the time intervals of most of the received beacons are 102.4 msec., and the time intervals of a few beacons are distributed with a difference of a few microseconds from 102.4 msec. This is because, although a sending AP transmits a beacon at an interval of 102.4 msec., delay may occur at the receiving end due to the characteristics of the wireless communication environment. Accordingly, only a few frames have a time interval different from 102.4 msec.

Figure 9:
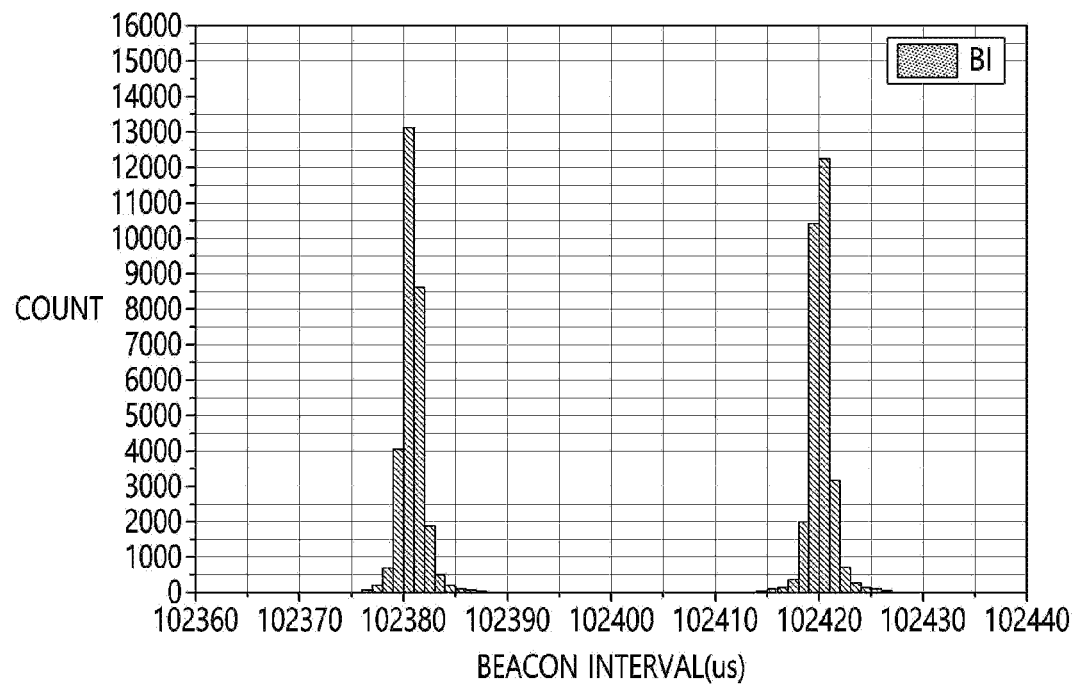
FIG. 9 is a view illustrating an example of different beacon time interval distribution patterns.

FIG. 9 is a view illustrating an example of a different pattern of the distribution of beacon time intervals.

Referring to FIG. 9, no beacon is present at an interval of 102.4 msec., which is a default time interval, and beacons are distributed such that the time intervals thereof are less than the default time interval or are greater than the default time interval.

Here, it may be inferred that the time interval of the beacon is arbitrarily changed so as to be less than or greater than the default value by arbitrarily adjusting the beacon transmission time of the AP.

That is, it may be inferred that transmission of covert information is attempted by adjusting the time interval of beacons.

For example, it may be inferred that a malicious AP transmits a beacon so as to have an interval less than the default time interval of the beacon (e.g., an interval of 102.38 msec. in FIG. 9) when it intends to send covert information '0' and that the malicious AP transmits a beacon so as to have an interval greater than the default time interval of the beacon (e.g., an interval of 102.42 msec. in FIG. 9) when it intends to send covert information '1'.

However, the time intervals according to the covert information may be set vice versa.

Also, covert information may be transmitted in such a way that beacons received at a default time interval are present and the time interval of beacons is adjusted so as to be less than or greater than the default time interval, as shown in FIG. 9.

Hereinafter, analyzing the statistical characteristics of the reception time of a periodic signal and the number of received frames thereof at step S525 will be described in detail.

For example, when the time interval value of the 'Beacon Interval' field in a received beacon frame is frequently changed, it may be determined that it is highly likely that a covert channel using a time interval is present.

Also, when a certain percentage (e.g., 95%) or higher of the received beacons are present at the default time interval or at the time interval defined in the 'Beacon Interval' field of the beacon frame, it may be determined that the possibility of presence of a covert channel using a beacon time interval is low.

Also, when the distribution of the number of received beacons according to a beacon time interval is checked, if the number of beacons received at a time interval that is neither the default time interval nor the time interval defined in the 'Beacon interval' field of the beacon frame is equal to or greater than a specific threshold, it may be determined that there is a high possibility of presence of a covert channel.

Hereinafter, a method for detecting a covert storage channel, which is a different form of covert channel, will be described in detail.

A covert storage channel is a way of directly storing covert information in network traffic. That is, using the technical characteristics of a communication protocol, covert information is directly inserted into the header or extended area of the protocol and is then transmitted.

For example, covert information may be inserted into the header or body area of a wireless communication protocol and transmitted. The 'Capability Info' field of a beacon frame body is used to announce the function of a specific wireless AP.

That is, the 'Capability Info' field contains information about network characteristics supported by the AP, such as whether a short preamble is supported, whether a short slot time is supported, and the like. The values of such fields seldom change once the initial settings of a specific AP have been made.

If the value of a MAC header, which is typically seldom changed, is frequently changed, it may be suspected that a covert storage channel for hiding covert information in the MAC header is present. The method of detecting such a covert storage channel will be described below.

First, fields having frequently changed values and fields having seldom changed values in the communication specifications of the wireless communication device to be checked are separated.

Subsequently, a field having a seldom changed value is selected in a received frame, and an XOR operation is performed on the currently received value thereof and on the value received immediately before the currently received value.

When the result of the XOR operation is 0, this indicates that the currently received value is equal to the value received immediately before the currently received value, whereas when the result of the XOR operation is not 0, a change count is increased by 1 because it is determined that a field that seldom changes has changed.

Subsequently, the above process is repeated until the change count becomes equal to or greater than a preset threshold.

Here, when the value of the change count is equal to or greater than a threshold, it is determined that there is a high possibility of presence of a covert storage channel using a seldom changed area of a communication protocol.

Figure 10:
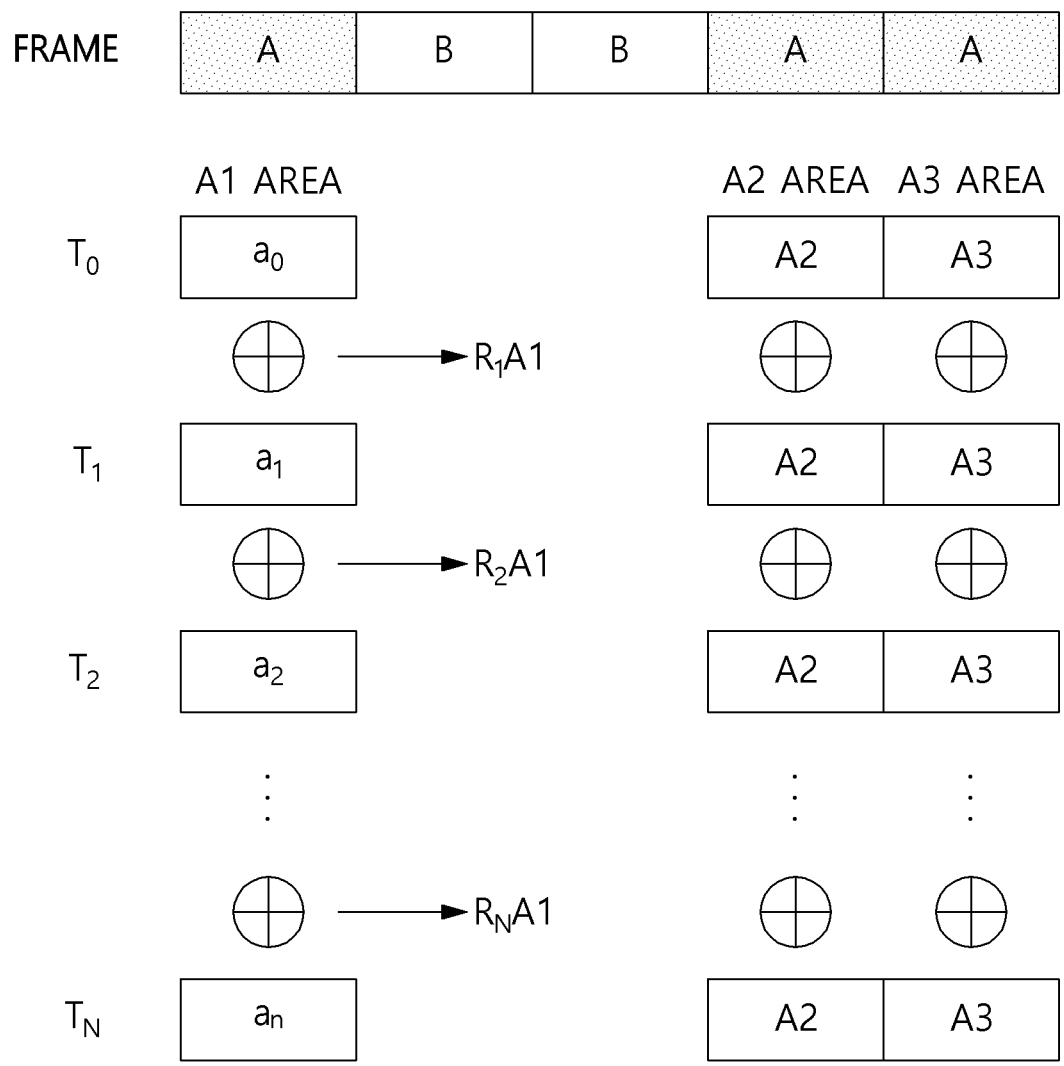
FIG. 10 is a view conceptually illustrating a method for detecting a covert storage channel.

FIG. 10 is a view conceptually illustrating a method for detecting a covert storage channel.

Referring to FIG. 10, area A indicates a field having a fixed value after the initial settings of a wireless communication device are made, that is, a field having a property that is seldom changed. Area B indicates a field having a frequently changed property when a wireless communication device transmits data. For example, data transmission/reception addresses, and the like correspond thereto.

The fields of a frame are separated into area A and area B depending on the specifications of the wireless communication device. Area A is stored by being separated into A1, A2, and AN, which are a first fixed area, a second fixed area, and an N-th fixed area, respectively, depending on the meaning of information contained in each frame area.

Describing the method applied to area A1 as an example, an XOR operation is performed on $a_0$, which is input at time $T_0$, and on $a_1$, which is input at time $T_1$, whereby $R_1A1$ is calculated. When the value of $R_1A1$ is not 0, the change count of area A1 is increased by 1.

An XOR operation is performed on $a_2$, which is input at time $T_2$, and on $a_1$, which is input immediately before $a_2$, whereby $R_2A1$ is calculated. When the value of $R_2A1$ is not 0, the change count of area A1 is increased by 1.

The above process is repeated until the change count of area A1 reaches a specific threshold. The above-described process for the first fixed area, A1, may be performed in parallel to the processes for areas A2 to AN.

As another example of a covert storage channel, covert information may be inserted using a constellation diagram of a wireless communication modulation method. Among modulation methods of wireless communication, Phase-Shift Keying (PSK) is a modulation method in which a phase conveys information.

Hereinafter, insertion of covert information using a constellation diagram will be described taking Quadrature Phase Shift Keying (QPSK) as an example.

Figure 11:
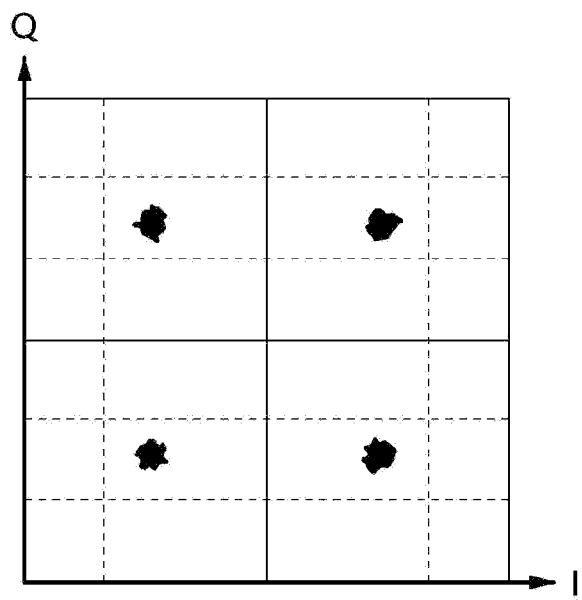
FIG. 11 is a view illustrating a constellation diagram of ideal Quadrature Phase-Shift Keying (QPSK)

FIG. 11 is a view illustrating an ideal QPSK constellation diagram.

Figure 12:
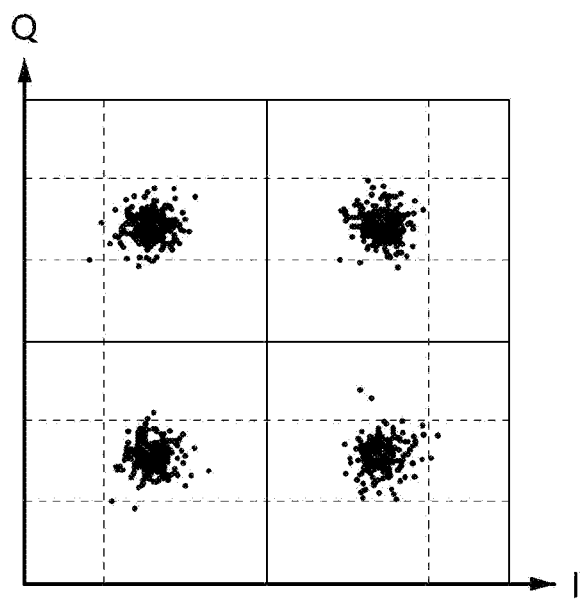
FIG. 12 is a view illustrating a constellation diagram of QPSK in a noise environment.

FIG. 12 is a view illustrating a constellation diagram of QPSK in a noise environment.

In an actual communication environment, a constellation diagram such as that shown in FIG. 12 is generally observed due to noise or the like.

A method of forming a covert storage channel using this characteristic is a method of conveying covert information by transforming the coordinates of a normal constellation diagram.

Figure 13:
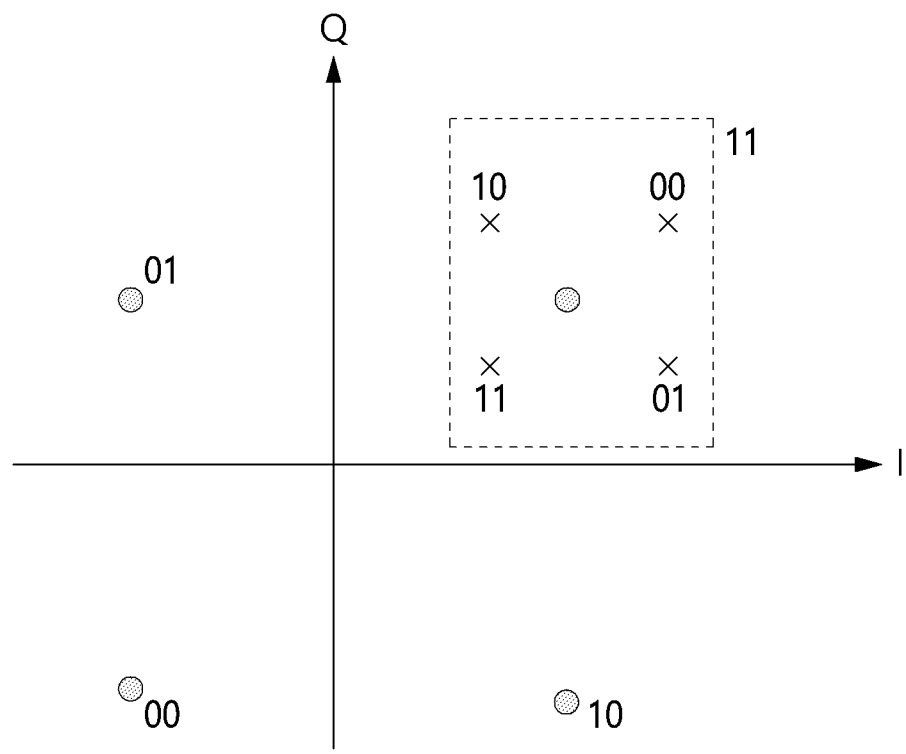
FIG. 13 is a view illustrating an example of a QPSK constellation diagram including covert information.

FIG. 13 is a view illustrating an example of a QPSK constellation diagram including covert information.

Referring to FIG. 13, the symbol marked with a circle indicates a normal symbol, and the symbol marked with X indicates a symbol generated using covert channel technology.

In FIG. 13, a single symbol may represent two bits of information. That is, a symbol in the first quadrant represents the information '11', a symbol in the second quadrant represents the information '01', a symbol in the third quadrant represents the information '00', and a symbol in the fourth quadrant represents the information '10'.

Here, the phase in the first quadrant is changed so as to have four cases, whereby two bits of information may be represented.

A normal receiver that receives information having the above-mentioned constellation diagram determines that symbol X is caused due to noise on the channel, thereby decoding symbol X to '11'.

However, a covert channel terminal checks the detailed phase of symbol X, thereby receiving two bits of covert information.

Accordingly, in the method according to an embodiment, a constellation diagram is measured while decreasing the distance from the wireless communication device to be checked, in order to detect a covert storage channel using such distortion of a constellation diagram.

As the distance from the wireless communication device to be checked to the apparatus for detecting a covert channel is shorter, an ideal constellation diagram of QPSK has to appear, but when a constellation diagram in a noise environment is still observed, it is determined that there is a high possibility of presence of a covert storage channel using modulation of the constellation diagram.

As another example of a covert storage channel, there is a covert storage channel using a CP.

A wireless communication specification using an Orthogonal Frequency-Division Multiplexing (OFDM) method uses a Cyclic Prefix (CP) in order to suppress interference between subcarriers caused by multipath delay.

Figure 14:
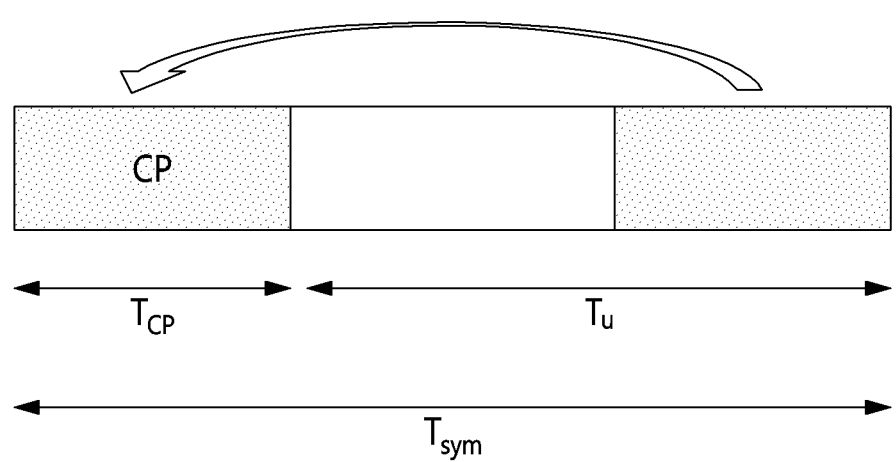
FIG. 14 is a view conceptually illustrating the structure of a Cyclic Prefix (CP)

FIG. 14 is a view conceptually illustrating the structure of a CP.

Referring to FIG. 14, $T_{CP}$ indicates a CP interval, $T_u$ indicates an effective symbol section, and $T_{sym}$ indicates the entire symbol section.

A normal CP is configured by copying the last ¼ part of the effective symbol section. In IEEE 802.11 a/b/g, $T_{CP}$ is 0.8 μs, and in IEEE 802.11n, $T_{CP}$ may also be 0.4 μs shorter than 0.8 μs. A reception unit discards a CP and reads the value of the effective symbol section, thereby analyzing a message.

A method of forming a covert channel using these characteristics is a method of inserting covert information into a CP such that a reception unit receives the covert information by reading the CP.

Therefore, in the method for detecting a covert storage channel using a CP according to an embodiment, when an OFDM symbol is received from the wireless communication device to be checked, a CP is stored, rather than being discarded.

Subsequently, whether the stored CP is the same as a copy of the last ¼ part of the received OFDM symbol is checked.

Here, when the stored CP is different from a copy of the last ¼ part of the received OFDM symbol, it is determined that there is a high possibility that a covert storage channel using a CP is present.

Figure 15:
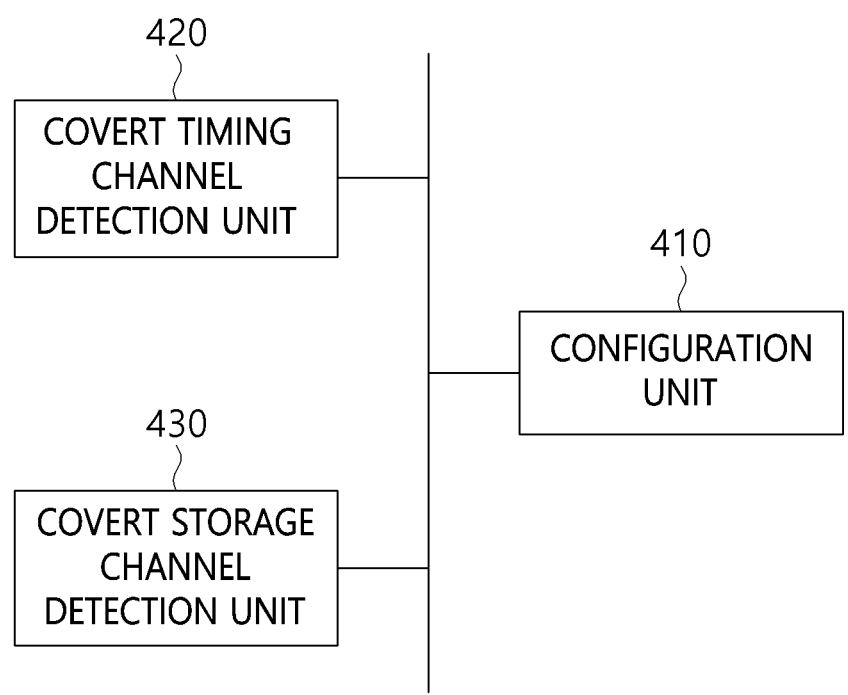
FIG. 15 is a block diagram illustrating an apparatus for detecting a covert channel in wireless communication according to an embodiment of the present invention.

FIG. 15 is a block diagram illustrating an apparatus for detecting a covert channel in wireless communication according to an embodiment of the present invention.

Referring to FIG. 15, the apparatus for detecting a covert channel in wireless communication according to an embodiment of the present invention includes a configuration unit 410 for setting a wireless communication specification, a covert timing channel detection unit 420 for detecting a covert timing channel, and a covert storage channel detection unit 430 for detecting a covert storage channel.

Here, the covert timing channel detection unit 420 functions to detect a covert timing channel in a specific wireless communication protocol.

Here, the covert storage channel detection unit 430 functions to detect a covert storage channel in a specific wireless communication protocol.

Here, the configuration unit 410 functions to set a wireless communication specification based on which a covert channel is to be detected.

Here, the covert timing channel detection unit 420 may identify a periodic signal based on the set wireless communication specification, analyze the reception time and the received frame of the periodic signal, and output a covert timing channel warning based on the analysis result.

Here, the covert timing channel detection unit 420 may determine that a covert timing channel is present when the frequency at which the period of the received signal changes is greater than a preset value.

Here, the covert timing channel detection unit 420 may determine that a covert timing channel is present when it is determined based on the distribution of the periodic signal that the number of signals having a period different from a preset period is greater than a threshold.

Here, the covert storage channel detection unit 430 may detect a covert storage channel based on the header or body information of a communication protocol, detect a covert storage channel based on constellation diagram distortion information, and detect a covert storage channel based on Cyclic Prefix (CP) interval information.

Here, the covert storage channel detection unit 430 may set the target field to be analyzed in the received frame, perform an XOR operation on the currently received value of the target field and the value thereof that was received immediately before the currently received value, and detect a covert storage channel based on the result of the XOR operation.

Here, the covert storage channel detection unit 430 may increase a change count when the result of the XOR operation is not 0, and may determine that a covert storage channel is present when the change count is greater than a threshold.

Here, the covert storage channel detection unit 430 may measure constellation diagrams at multiple points that are different distances away from a wireless communication device, and may detect a covert storage channel based on the constellation diagrams corresponding to the multiple points.

Here, the covert storage channel detection unit 430 may store information about a Cyclic Prefix (CP) interval contained in an Orthogonal Frequency-Division Multiplexing (OFDM) symbol and detect a covert storage channel based on a result of comparison of the CP interval with a part corresponding to the CP in the OFDM symbol (data payload).

Figure 16:
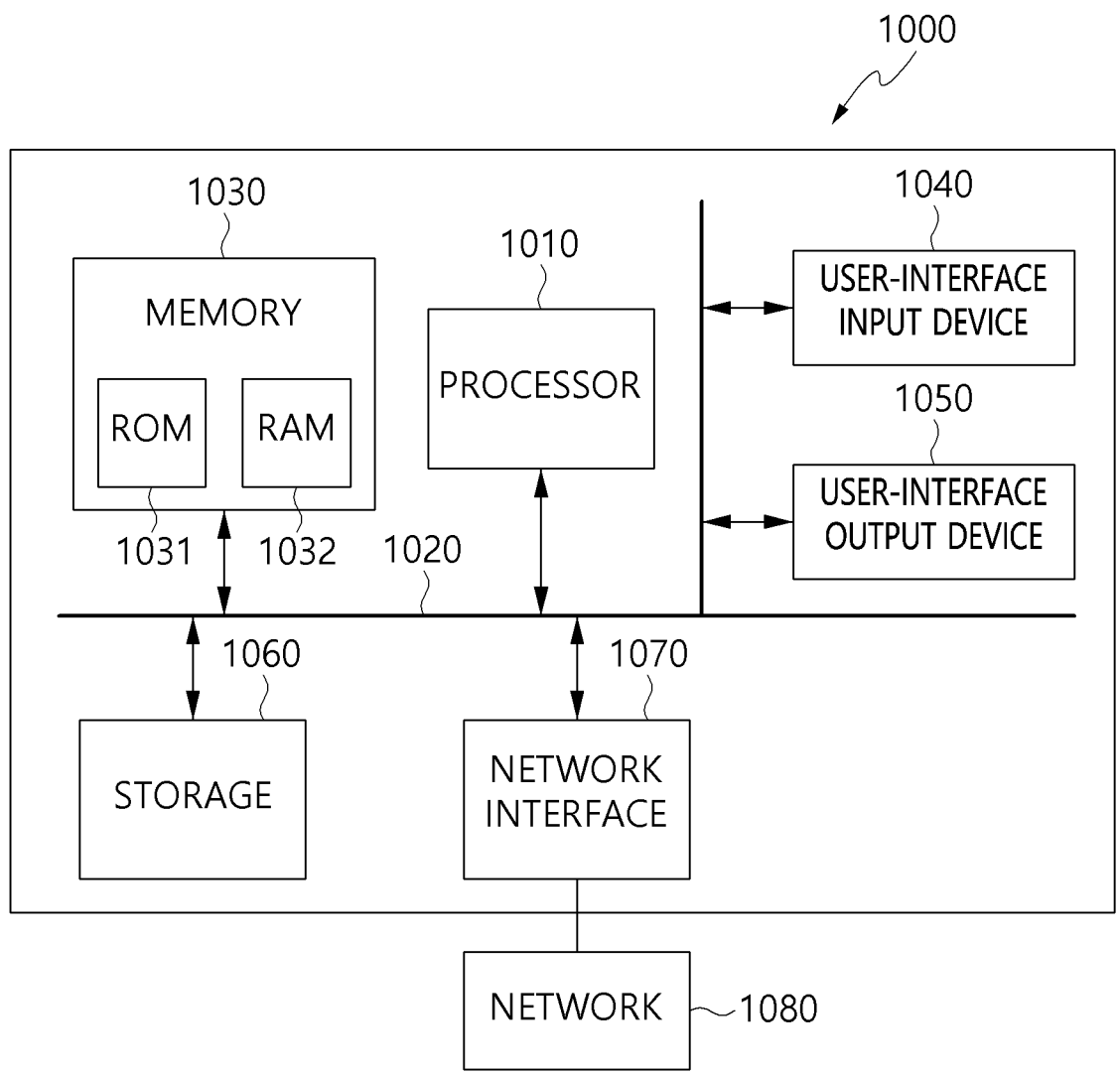
FIG. 16 is a view illustrating the configuration of a computer system according to an embodiment.

FIG. 16 is a view illustrating the configuration of a computer system according to an embodiment.

The apparatus for detecting a covert channel in wireless communication according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to the present invention, a method for detecting a covert timing channel and a covert storage channel may be provided.

Also, according to the present invention, a covert timing channel may be detected by analyzing periodic characteristics of received signals.

Also, according to the present invention, a covert storage channel may be detected by analyzing various types of information about received signals.

Specific implementations described in the present invention are embodiments and are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for detecting a covert channel in wireless communication, comprising:
    setting a wireless communication specification;
    detecting a covert timing channel; and
    detecting a covert storage channel,
    wherein detecting the covert timing channel includes
    identifying a periodic signal based on the wireless communication specification;
    analyzing a reception time and a received frame of the periodic signal; and
    outputting a covert timing channel warning based on an analysis result.

2. The method of claim 1, wherein analyzing the reception time and the received frame of the periodic signal comprises determining that a covert timing channel is present when a frequency at which a period of the received signal changes is greater than a preset value.

3. The method of claim 1, wherein analyzing the reception time and the received frame of the periodic signal comprises determining that a covert timing channel is present when it is determined based on a distribution of the periodic signal that a number of signals having a period different from a preset period is greater than a threshold.

4. A method for detecting a covert channel in wireless communication, comprising:
    setting a wireless communication specification;
    detecting a covert timing channel; and
    detecting a covert storage channel,
    wherein detecting the covert storage channel includes
    detecting a covert storage channel based on header or body information of a communication protocol;
    detecting a covert storage channel based on constellation diagram distortion information; and
    detecting a covert storage channel based on information about a Cyclic Prefix (CP) interval.

5. The method of claim 4, wherein detecting the covert storage channel based on the header or body information of the communication protocol includes
    setting a target field to be analyzed in a received frame;
    calculating a value of an XOR operation on a currently received value of the target field and a value received immediately before the currently received value; and
    detecting the covert storage channel based on the value of the XOR operation.

6. The method of claim 5, wherein detecting the covert storage channel based on the value of the XOR operation comprises increasing a change count when the value of the XOR operation is not 0 and determining that a covert storage channel is present when the change count is greater than a threshold.

7. The method of claim 4, wherein detecting the covert storage channel based on the constellation diagram distortion information includes
    measuring constellation diagrams at multiple points that are different distances away from a wireless communication device; and
    detecting the covert storage channel based on the constellation diagrams corresponding to the multiple points.

8. The method of claim 4, wherein detecting the covert storage channel based on the information about the CP interval includes
    storing the information about the CP interval contained in an Orthogonal Frequency-Division Multiplexing (OFDM) symbol; and detecting the covert storage channel based on a result of comparison of the CP interval with a part corresponding to the CP interval in the OFDM symbol.

9. An apparatus for detecting a covert channel in wireless communication, comprising:
 a configuration unit for setting a wireless communication specification;
 a covert timing channel detection unit for detecting a covert timing channel; and
 a covert storage channel detection unit for detecting a covert storage channel,
 wherein the covert timing channel detection unit identifies a periodic signal based on the wireless communication specification, analyzes a reception time and a received frame of the periodic signal, and outputs a covert timing channel warning based on an analysis result.

10. The apparatus of claim 9, wherein the covert timing channel detection unit determines that a covert timing channel is present when a frequency at which a period of the received signal changes is greater than a preset value.

11. The apparatus of claim 9, wherein the covert timing channel detection unit determines that a covert timing channel is present when it is determined based on a distribution of the periodic signal that a number of signals having a period different from a preset period is greater than a threshold.

12. The apparatus of claim 9, wherein the covert storage channel detection unit detects a covert storage channel based on header or body information of a communication protocol, detects a covert storage channel based on constellation diagram distortion information, and detects a covert storage channel based on information about a Cyclic Prefix (CP) interval.

13. The apparatus of claim 12, wherein the covert storage channel detection unit sets a target field to be analyzed in a received frame, calculates a value of an XOR operation on a currently received value of the target field and a value received immediately before the currently received value, and detects the covert storage channel based on the value of the XOR operation.

14. The apparatus of claim 13, wherein the covert storage channel detection unit increases a change count when the value of the XOR operation is not 0, and determines that a covert storage channel is present when the change count is greater than a threshold.

15. The apparatus of claim 12, wherein the covert storage channel detection unit measures constellation diagrams at multiple points that are different distances away from a wireless communication device, and detects the covert storage channel based on the constellation diagrams corresponding to the multiple points.

16. The apparatus of claim 12, wherein the covert storage channel detection unit stores the information about the CP interval contained in an Orthogonal Frequency-Division Multiplexing (OFDM) symbol and detects the covert storage channel based on a result of comparison of the CP interval with a part corresponding to the CP interval in the OFDM symbol.

* * * * *